US008905071B2

(12) United States Patent
Coombs et al.

(10) Patent No.: US 8,905,071 B2
(45) Date of Patent: Dec. 9, 2014

(54) INTEGRATED MANIFOLD SYSTEM FOR CONTROLLING AN AIR SUSPENSION

(75) Inventors: Joshua D. Coombs, East Lansing, MI (US); Aaron Mulder, Okemos, MI (US)

(73) Assignee: Air Lift Company, Lansing, MI (US)

( * ) Notice: Subject to any disclaimer, the term of this patent is extended or adjusted under 35 U.S.C. 154(b) by 467 days.

(21) Appl. No.: 12/912,212

(22) Filed: Oct. 26, 2010

(65) Prior Publication Data

US 2012/0097282 A1 Apr. 26, 2012

(51) Int. Cl.

| | |
|---|---|
| ***F15B 13/04*** | (2006.01) |
| ***F15B 13/00*** | (2006.01) |
| ***F16K 1/00*** | (2006.01) |
| ***F15B 13/08*** | (2006.01) |

(52) U.S. Cl.

CPC ......... *F15B 13/0814* (2013.01); *F15B 13/0853* (2013.01)

USPC .......................................... 137/596; 137/884

(58) Field of Classification Search

USPC ........................ 137/596, 596.14, 596.16, 884

See application file for complete search history.

(56) References Cited

U.S. PATENT DOCUMENTS

| | | | | |
|---|---|---|---|---|
| 3,504,704 | A * | 4/1970 | Beckett et al. | 137/625.64 |
| 4,733,876 | A | 3/1988 | Heider et al. | |
| 5,141,201 | A | 8/1992 | Mizuno et al. | |
| 5,904,172 | A * | 5/1999 | Gifft et al. | 137/224 |
| 5,913,525 | A | 6/1999 | Schneider et al. | |
| 6,050,573 | A | 4/2000 | Kunz | |
| 6,098,995 | A | 8/2000 | Danis | |
| 6,161,845 | A | 12/2000 | Shono et al. | |
| 6,502,837 | B1 | 1/2003 | Hamilton et al. | |
| 6,546,959 | B2 * | 4/2003 | Cross et al. | 137/627.5 |
| 7,104,547 | B2 | 9/2006 | Brookes et al. | |
| 7,213,612 | B2 * | 5/2007 | Weiler, Jr. | 137/596.17 |
| 7,234,707 | B2 * | 6/2007 | Green et al. | 280/5.511 |
| 7,267,331 | B2 | 9/2007 | Holbrook et al. | |
| 7,287,760 | B1 | 10/2007 | Quick et al. | |
| 7,357,397 | B2 | 4/2008 | Brookes et al. | |
| 7,364,144 | B2 | 4/2008 | Nordmeyer | |
| 7,380,799 | B2 | 6/2008 | Niaura et al. | |

(Continued)

OTHER PUBLICATIONS

AccuAIR Suspension VU4, 4-Corner Valve Unit, downloaded from http://www.accuairsuspension.com/product_vu4.html on Mar. 1, 2011.

(Continued)

*Primary Examiner* — Craig Schneider
*Assistant Examiner* — Michael R Reid
(74) *Attorney, Agent, or Firm* — Warner Norcross & Judd LLP

(57) ABSTRACT

An integrated manifold system maximizes space for the circuit board while enabling efficient control of one or more pneumatic devices. The manifold system includes a manifold block, a solenoid valve attached to the manifold block, and a circuit board for controlling the solenoid and other components of an air suspension system. The manifold block includes at least one service port for connecting to a pneumatic device such as an air spring, and a supply port for connecting to a compressor. The solenoid valve is mounted to the manifold block with its longitudinal length being generally parallel to the service port. The circuit board is mounted adjacent to the solenoid valve and oriented generally parallel to the solenoid and service port. A cover encloses the solenoid valve and the circuit board. In one embodiment, the solenoid valve is in fluid communication with the supply port. The solenoid valve is uniquely associated with the service port.

18 Claims, 12 Drawing Sheets

(56) References Cited

U.S. PATENT DOCUMENTS

| | | | | |
|---|---|---|---|---|
| 7,398,668 | B2 | 7/2008 | Nordmeyer | |
| 7,420,462 | B2 | 9/2008 | Nordmeyer | |
| 7,423,393 | B2 | 9/2008 | Wakao et al. | |
| 7,429,050 | B2 | 9/2008 | Amano | |
| 7,441,782 | B2 | 10/2008 | Stiller | |
| 7,532,110 | B2 | 5/2009 | Nordmeyer | |
| 7,607,667 | B2 | 10/2009 | Brookes et al. | |
| 7,621,538 | B2 | 11/2009 | Nordmeyer et al. | |
| 7,644,933 | B2 | 1/2010 | Brookes et al. | |
| 7,644,943 | B2 | 1/2010 | Hayes et al. | |
| 7,798,174 | B2 * | 9/2010 | Ford et al. | 137/884 |
| 2003/0226606 | A1 * | 12/2003 | Hayashi et al. | 137/884 |
| 2006/0032541 | A1 * | 2/2006 | Ford et al. | 137/884 |
| 2006/0267297 | A1 | 11/2006 | Nordmeyer et al. | |
| 2007/0120334 | A1 | 5/2007 | Holbrook | |
| 2007/0282498 | A1 | 12/2007 | Holbrook et al. | |
| 2008/0136669 | A1 | 6/2008 | Nordmeyer | |
| 2008/0174079 | A1 | 7/2008 | Brookes et al. | |
| 2008/0228352 | A1 | 9/2008 | Brookes et al. | |
| 2008/0246596 | A1 | 10/2008 | Nordmeyer | |
| 2008/0290617 | A1 | 11/2008 | Bounds | |
| 2009/0105905 | A1 | 4/2009 | Hoffman | |
| 2009/0216403 | A1 | 8/2009 | Holbrook | |
| 2010/0030425 | A1 | 2/2010 | Holbrook et al. | |
| 2010/0138116 | A1 | 6/2010 | Coombs | |

OTHER PUBLICATIONS

Numatics 2002 Series Valve, downloaded from http://www.numatics.com/applications/products/valves/2002.aspx on Mar. 1, 2011.

Numatics L1 Series Valve, downloaded from http://www.numatics.com/applications/products/valves/11.aspx on Mar. 1, 2011.

Asco Micro-Miniature Solenoid Valves, downloaded from http://ascovalve.com/Applications/Products/MicroMiniatureSolenoidValves.aspx on Mar. 1, 2011.

* cited by examiner

INTEGRATED MANIFOLD SYSTEM FOR CONTROLLING AN AIR SUSPENSION

BACKGROUND OF THE INVENTION

The present invention relates to vehicle air suspension systems, and more particularly to an integrated manifold system for selectively controlling the components of an air suspension system.

Air suspension systems are well known for providing a softer, more comfortable ride for a vehicle. Other common applications for air suspension systems include: raising or lowering a vehicle; leveling a vehicle that is under a load; leveling recreational vehicles parked on inclined surfaces; and altering the performance characteristics of a vehicle. Air suspension systems may be installed on a vehicle by the original equipment manufacturer, or they may be purchased as aftermarket products that are substitutes or supplements for convention coil spring suspensions.

Common air suspension systems typically include one or more pneumatic devices, such as air springs, connected between the vehicle axles and the vehicle chassis. Pressurized air from a compressor or alternate source can be forced into or exhausted from one or more of the air springs to provide the vehicle with desired suspension characteristics.

As air suspension systems become more complex, manufacturers have utilized integrated manifold systems to control the air flow between the compressor and the air springs. For example, pressurized air from a compressor is routed to a single input port on a manifold block, and then routed out of the manifold block through a plurality of output ports, with each output port connected to one of the air springs. One or more valves on the manifold can be controlled to select which output ports are connected to the pressurized air source, and which output ports are connected to an exhaust port for selectively filling and exhausting the air springs. The valves may be solenoid valves that are electrically controlled by a controller connected to the system.

One such manifold system is shown in FIGS. 1 and 2 and generally designated 300. In this system, a plurality of manifold blocks 302, 304 and 306 are stacked on top of each other. The upper block 302 defines a plurality of ports for receiving solenoid valves 308 that extend into the upper block 302 in a direction generally perpendicular to the upper face 310 of the block 302. The lower manifold blocks 304, 306 each include internal ports that communicate with the solenoids and with service ports positioned on the exterior of the blocks 304, 306. Outlet fittings 312 connected to the service ports may be connected to air springs with hoses attached to the fittings 312. One of the blocks includes an supply port (not shown) for receiving pressurized air from a compressor. In general, each of the solenoid valves 308 directly communicates with one of the service ports with a movable poppet attached to the plunger of the solenoid. The poppet may be moved between a first position in which the associated service port is sealed from the supply port and a second position in which air from the supply port is allowed to flow through the associated service port. Circuit boards 320, 321 are stacked over the upper ends of the solenoids and are electrically connected to the solenoids. The circuit boards 320, 321 communicate with a controller to selectively activate the solenoids. A cover 330 is attached over the solenoids and the circuit boards to form a sealed enclosure for the system. A similarly configured manifold unit with "vertically oriented" solenoid valves that are mounted perpendicular to the upper surface of a manifold block is manufactured and sold by Accuair™ and marketed to as the "VU4 Solenoid Valve Unit".

Manifold systems such as those described above suffer from a variety of difficulties. First, the perpendicular orientation of the solenoids with respect to the manifold blocks limits the area over which the circuit board can be mounted as the circuit board must be constrained to the size of the vertical ends of the solenoids to prevent it from extending beyond the edges of the manifold block. Additional solenoid valves can increase this surface area, but they also increase the need for more circuit board components. Second, the vertical orientation of the solenoids limits the usable space on the circuit board, because the area of the circuit board immediately above each solenoid must be free from components to allow enough space for the solenoid. The combination of (1) limited space on the manifold for mounting the circuit board and (2) limited usable space on the circuit board limits the amount of components that can be attached to the circuit board for operating and monitoring the suspension system, and often requires the use of multiple, stacked circuit boards. In addition, the vertical, direct acting solenoids require many ports to be formed into the manifold blocks, which can result in the need for multiple, stacked manifold blocks and can require tedious manufacturing work to form ports with the necessary depth. This can prevent the formation of manifold blocks by some of the most cost effective methods, such as injection molding. As a result of these and other difficulties, manufacturers continue to search for a more space efficient manifold system that can be cost effectively manufactured.

SUMMARY OF THE INVENTION

The present invention provides a manifold system that maximizes space for the circuit board while enabling efficient control of multiple pneumatic devices.

In one embodiment, the manifold system includes a manifold block, at least one solenoid attached to the manifold block that is capable of manipulating air flow through the manifold block, and a circuit board for controlling the solenoid and other components of an air suspension system. The manifold block includes at least one service port for connecting to a pneumatic device such as an air spring and a supply port for connecting to a compressor. In one embodiment, the manifold block additionally includes an exhaust port. The solenoid valve is mounted to the manifold block with its longitudinal length (i.e., its direction of travel) being generally parallel to the supply port. The circuit board is mounted adjacent to the solenoid valve such that it is oriented generally parallel to the supply port and the longitudinal length of the solenoid. A cover encloses the solenoid valves and the circuit board.

In another embodiment, the manifold block is configured such that it provides efficient air flow and is relatively easily manufactured. The at least one solenoid valve is in fluid communication with the supply port and the service port. The solenoid valve may be movable between a closed position preventing fluid flow from the supply port to the associated service port and an open position allowing fluid flow from the supply port to the associated service port. In one embodiment, the manifold block includes a plurality of service ports and a plurality of solenoids, with each service portion uniquely associated with one of the solenoids. In addition, an exhaust solenoid valve may be included and may be uniquely associated with the exhaust port. The exhaust solenoid valve is movable between a closed position preventing fluid flow from the supply port to the exhaust port and an open position allowing fluid flow from the supply port to the exhaust port.

In another embodiment, at least one pressure sensor port is defined in the manifold block, the pressure sensor port extends into fluid communication with the service port. A pressure sensor is attached to the circuit board, and is uniquely associated with, and extends into, the pressure sensor port. The pressure sensor is capable of outputting a signal indicative of the fluid pressure level within the associated service port. In yet another embodiment, a plurality of connector pins extend from the circuit board. The connector pins may be plugged into a power supply, or to receptacle on a computer for transferring information indicative of the status of the solenoids, the fluid pressure levels, the compressor and the air springs.

The configuration of the solenoid, or multiple solenoids, positioned parallel to the manifold and the circuit board increases the amount of space for the circuit board. In addition, the utilization of the supply port for transporting both the pressurized air to the service port and the exhausted air to an exhaust port can reduce the number of ports that are required in the manifold, making the manifold easier to manufacture, and enabling the manifold to be formed by more cost effective methods, such as injection molding.

DETAILED DESCRIPTION OF THE CURRENT EMBODIMENT

I. Overview

Figure 1:
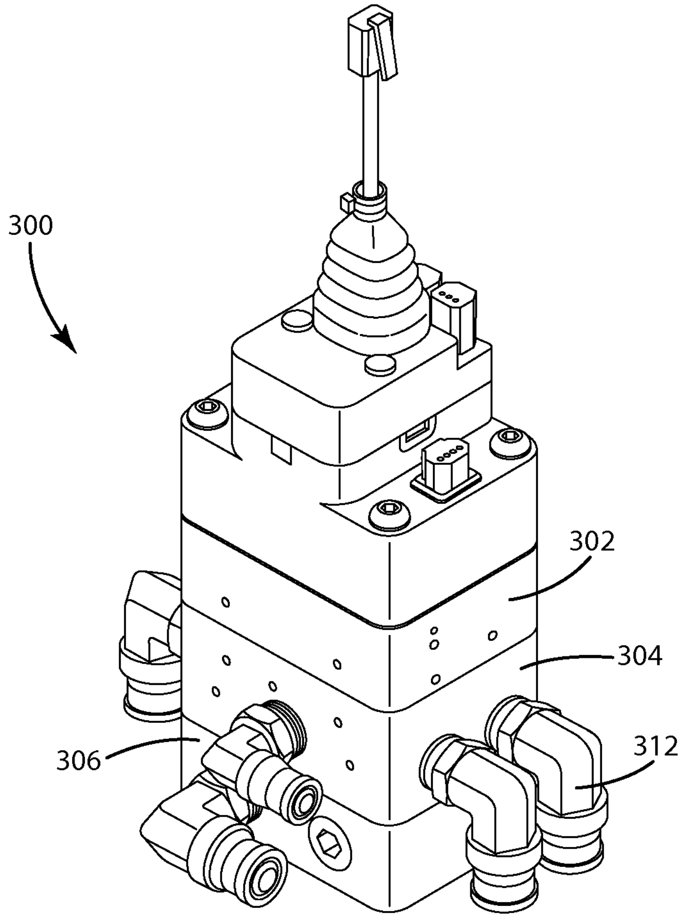
Fig. 1 (Prior Art)
FIG. 1 is a perspective view of a prior art manifold system.
Figure 2:
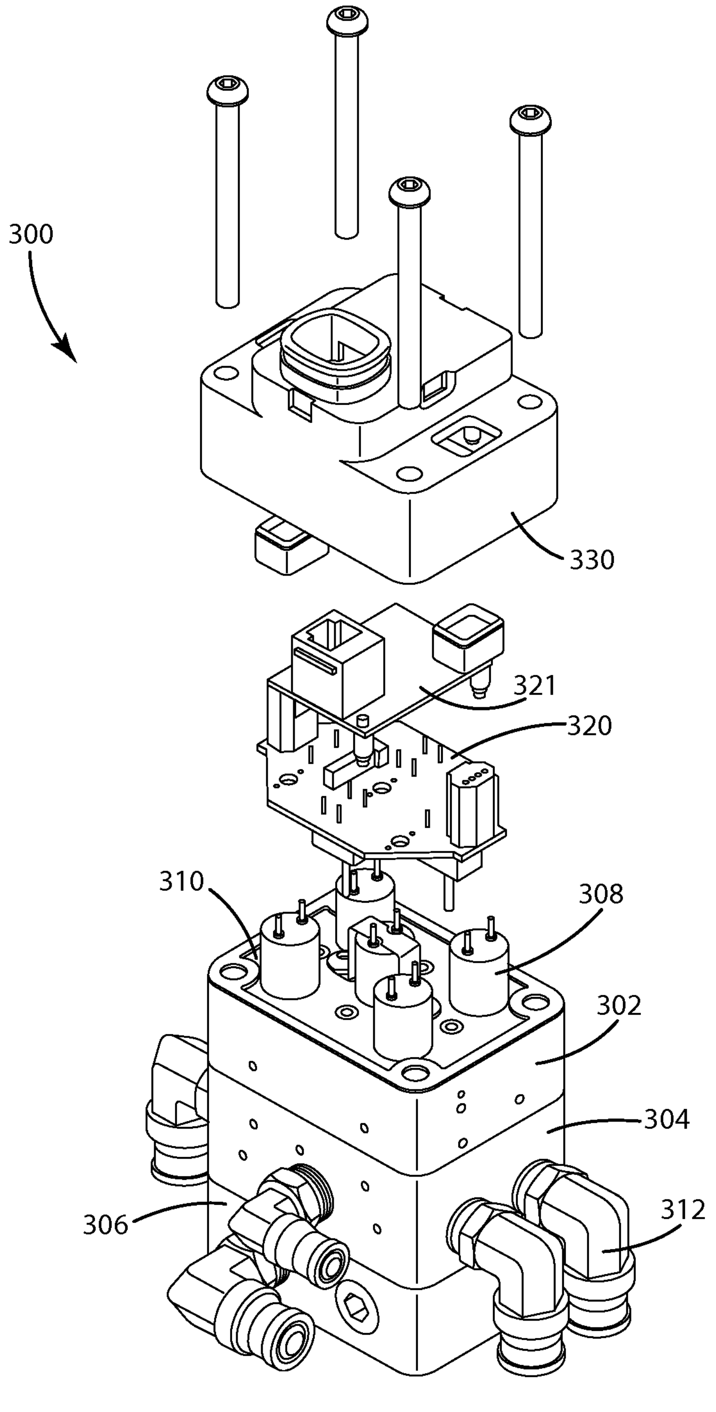
Fig. 2 (Prior Art)
FIG. 2 is an exploded view of the prior art manifold system.
Figure 3:
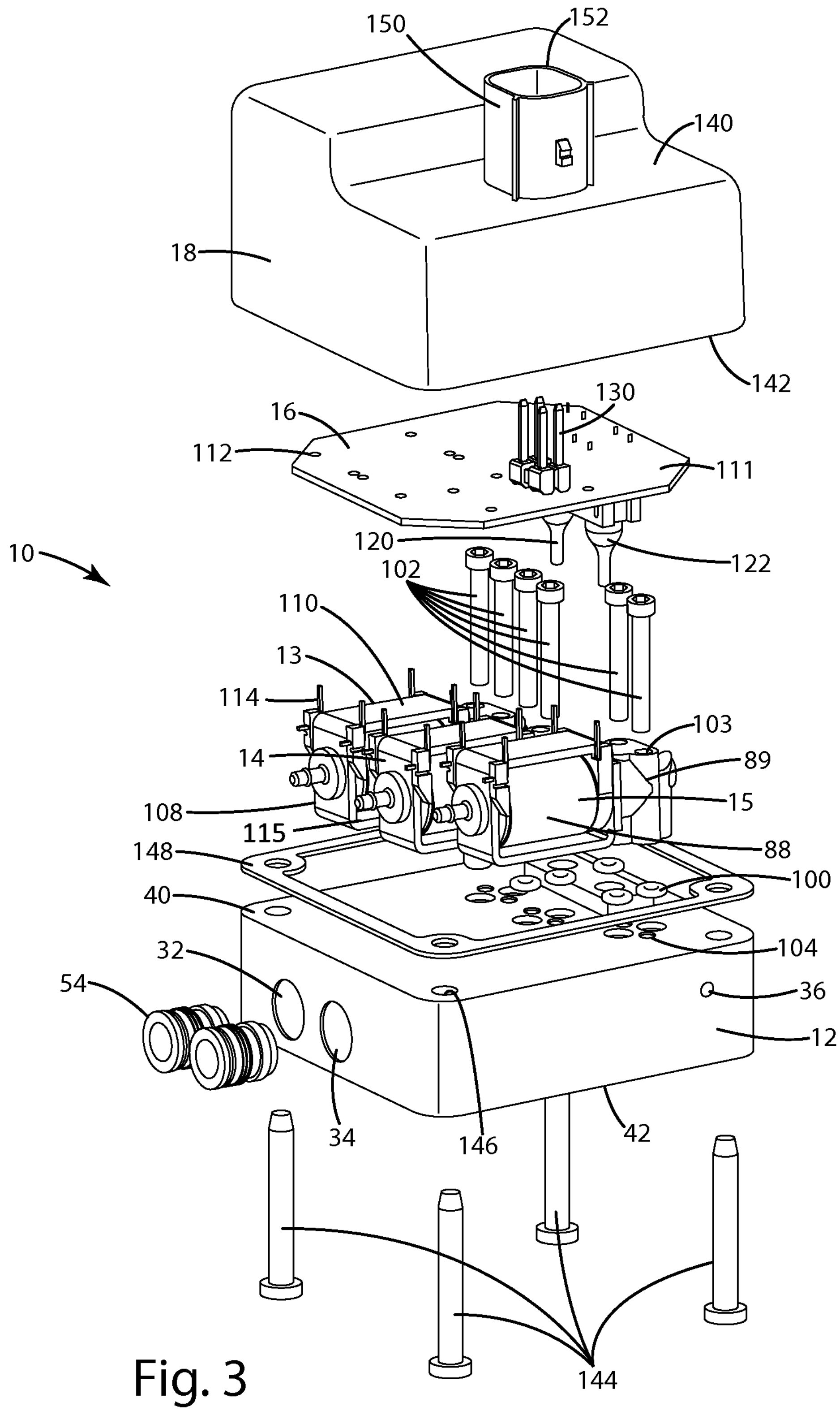
FIG. 3 is an exploded view of a manifold system according to one embodiment of the present invention.

An integrated manifold system according to one embodiment of the present invention is shown in FIG. 3 and generally designated 10. The manifold system 10 is operable to control and monitor various components of a vehicle air suspension system, including one or more air springs in applications ranging from complex primary suspension replacement to basic load-assist products.

In one embodiment, the manifold system 10 generally includes a manifold block 12, a plurality of solenoids 13, 14, 15 mounted on the manifold 12, a circuit board 16 mounted to the solenoids 14 or the manifold 12, and a cover 18 enclosing the solenoids 14 and the circuit board 16 to form a sealed, enclosed system 10. As illustrated, the manifold 12 includes a supply port 20, a first pair of service ports 22, 24 and an exhaust port 26. The supply port 20 is capable of being operably connected to a pressurized air source, such as an air compressor. The service ports 22, 24 are each capable of being operably connected to any type of pneumatic device, including an air spring, a shock absorber or a tank. The exhaust port 26 opens to the environment. Although the illustrated embodiment shows two service ports 22, 24, the manifold system 10 may alternatively have any desired number of service ports, including a single service port, in order to control a desired number of pneumatic devices. In addition, in one embodiment, the manifold 12 may not include an exhaust port. In this embodiment, the supply port 20 or one or more of the service ports 22, 24 may operate as exhaust ports. For example, in one embodiment the service ports 22, 24 may be connected to air springs that include an exhaust, or the supply port 20 may be connected to a compressor with integrated exhaust.

II. Structure

Figure 4:
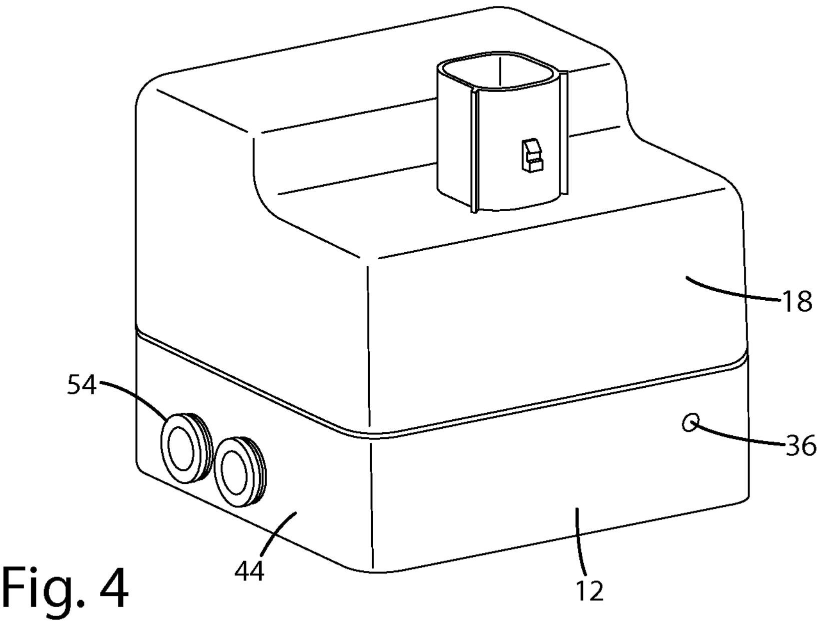
FIG. 4 is a perspective view of the manifold system.
Figure 5:
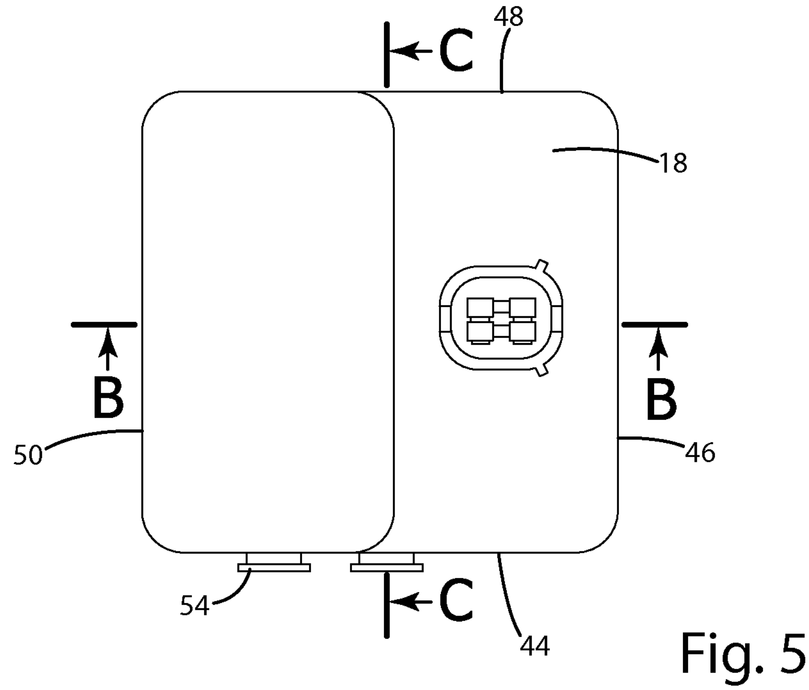
FIG. 5 is a top view of the manifold system.

As shown in FIGS. 3 and 4, the manifold 12 is a block that may be formed from a variety of materials, including aluminum or another metal, or from injection molded plastic. The manifold 12 defines multiple ports extending at least a portion of the way through the manifold 12. In one embodiment, the manifold defines a supply port 20 having an inlet 30, a first service port 22 having an outlet opening 32, a second service port 24 having a second outlet opening 34, and an exhaust port 26 having an exhaust opening 36. The manifold includes an upper surface 40, a lower surface 42, a first side 44, a second side 46, a third side 48 and a fourth side 50.

Figure 6:
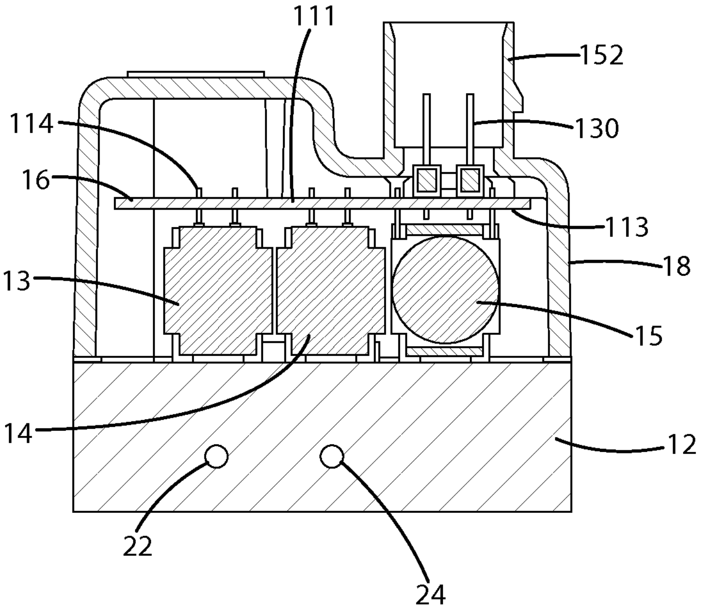
FIG. 6 is cross sectional view of the manifold system taken along line B-B in FIG. 3.
Figure 7:
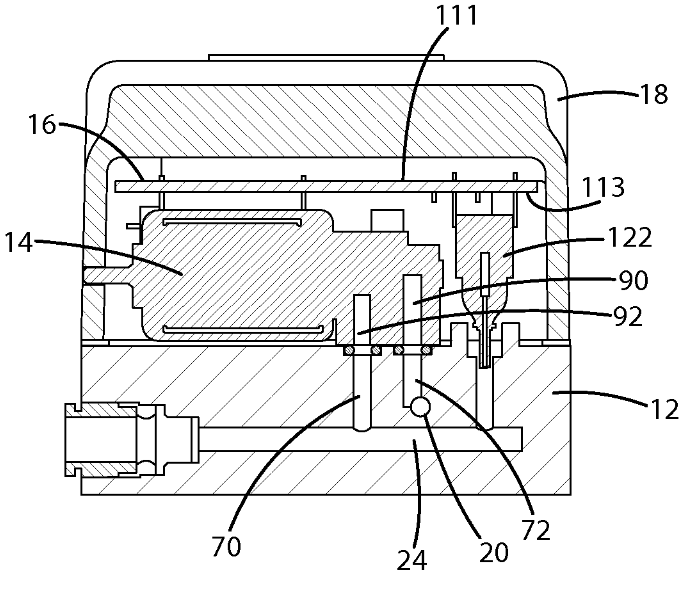
FIG. 7 is a cross sectional view of the manifold system taken along line C-C in FIG. 3.
Figure 8:
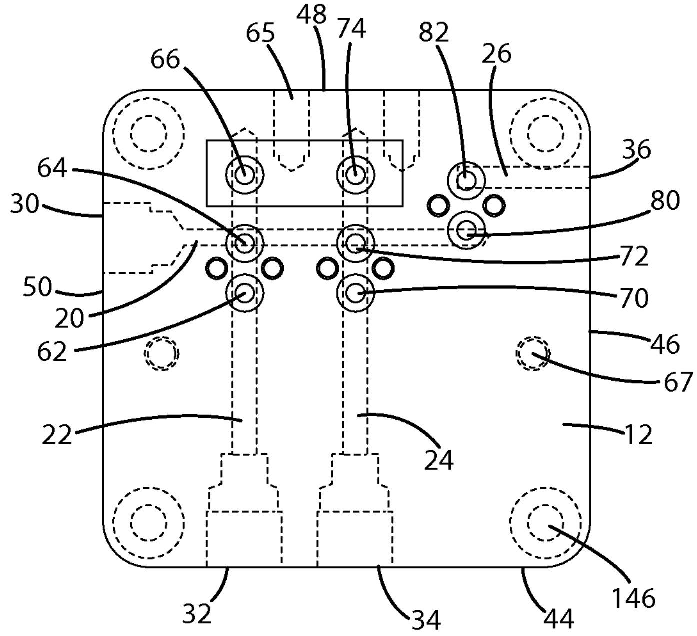
FIG. 8 is a top view of the manifold according to one embodiment of the present invention.

The positioning and extent of the ports within the manifold 12 are shown in FIGS. 6-8. FIG. 6 shows a top view of the manifold 12 with the ports shown in broken lines. In one embodiment, the supply port 20 extends into the manifold 12 from the fourth side 50 of the manifold 12. The supply port 20 may include an inlet fitting (not shown) inserted into the inlet 30 enabling quick connection to an air hose 52. The first service port 22 extends into the manifold 12 from the first side 44 of the manifold 12 and may include a service port fitting 54 inserted into the opening 32 to enable quick connection and removal of an air hose 56. The second service port 24 extends into the manifold 12 from the first side 44 generally parallel to the first service port 22 and may include a service port fitting 58 inserted into the opening 34 to enable quick connection and removal of an air hose 60. The exhaust port 26 extends into the manifold 12 from the second side 46 of the manifold 12. A first solenoid flow port 62, a first solenoid intake port 64 and a first pressure sensor port 66 extend into the manifold 12 from the upper surface 40. A second solenoid flow port 70, a second solenoid intake port 72 and a second pressure sensor port 74 also extend into the manifold 12 from the upper surface 40. Finally, a third solenoid supply port 80 and a solenoid exhaust port 82 extend into the manifold 12 from the upper surface 40. The diameters of each of the ports may vary from application to application. In the illustrated embodiment, the diameter of the supply port 20 is about 0.1 inches, the diameter of the first 22 and second service ports are about 0.1 inches and the diameter of the exhaust port is about 0.1 inches. In one embodiment, the manifold 12 additionally includes threaded mounting holes 65, 67 extending into the manifold for mounting the manifold to a desired surface. The mounting holes 65, 67 may be located in any desired location on the manifold block 12.

The solenoids 13, 14, 15 are generally conventional, and therefore will not be described in great detail. In one embodiment, the solenoids may be RB Series valves manufactured by Numatics®. Suffice it to say that each solenoid includes a plunger (not shown) that can be actuated to move between a first position and a second position. A portion of the plunger is disposed within a generally cylindrical plunger housing 88, and a portion of the plunger extends into a valve body 89 attached to the plunger housing 88. The solenoid has a longitudinal length extending in the direction of the central axis of the plunger housing 88. The longitudinal length of the solenoid is generally greater than the diameter or the width of the plunger housing 88. The plunger generally operates to selectively reciprocate along the longitudinal length of the solenoid. In one embodiment, the valve body 89 of each solenoid 13, 14, 15 includes an intake passage 90 and an outlet passage 92. When the plunger is in the first or “closed” position, the portion of the plunger extending into the valve body seals off fluid flow through the valve body to prevent fluid flow through the outlet passage 92. When the plunger is in the second or “open” position, the solenoid allows fluid to flow into the intake passage 90 and through the outlet passage 92. In the illustrated embodiment, the solenoids 13, 14, 15 are mounted to the upper surface 40 of the manifold 12 to control fluid flow through the various ports in the manifold 12 while providing sufficient area for mounting a circuit board 16 adjacent to the solenoids. As shown, the solenoids 13, 14, 15 are mounted with their longitudinal lengths oriented generally parallel to the upper surface 40 of the manifold 12 and to the longitudinal length of the supply port 20, such that the solenoid plungers (not shown) are movable in a direction generally parallel to the upper surface 40 of the manifold 12 and the supply port 20. In another embodiment, the solenoids 13, 14, 15 may be mounted such that their longitudinal lengths form an angle with respect to the upper surface of the manifold 12 or the supply port 20, but the solenoids are typically mounted such that the angle formed between the longitudinal axis of the solenoids and the upper surface 40 of the manifold 12 is less than 45 degrees, as greater mounting angles tend to reduce the surface area available for mounting the circuit board 16 as described in more detail below.

The first solenoid 13 is positioned on the upper surface 40 of the manifold 12 with the inlet passage 90 of the first solenoid 13 aligned with the first solenoid intake port 64 and the outlet passage 92 aligned with the first solenoid flow port 62. The second solenoid 14 is positioned on the upper surface 40 of the manifold 12 with the inlet passage 90 of the second solenoid 14 aligned with the second solenoid intake port 72 and the outlet passage 92 aligned with the second solenoid flow port 70. The third solenoid 15 is positioned on the upper surface 40 of the manifold 12 with the intake passage 90 of the third solenoid 15 aligned with the solenoid exhaust port 82 and the outlet passage 92 of the third solenoid 15 aligned with the third solenoid intake port 80. In one embodiment, sealing rings 100 made from rubber or another sealing material are positioned between each of the solenoid ports and its corresponding manifold port. Each solenoid 13, 14, 15 may be mounted to the manifold 12 by fasteners 102 extending through corresponding holes 103 in the valve body 89 of each plunger and into holes 104 in the manifold 12. Of course, the mounting arrangements may vary from application to application. In addition, each solenoid 13, 14, 15 may include a bracket 108 extending around a portion of the solenoid, such as the plunger housing 88. The bracket 108 may include an upper surface 110 and a lower surface 115 opposite the upper surface and facing the manifold 12.

In one embodiment, the supply port 20 extends into the manifold 12 such that it is in fluid communication with the first solenoid intake port 64, the second solenoid intake port 72 and the third solenoid intake port 80. The supply port 20 of this embodiment thus forms a solenoid galley that is capable of supplying pressurized air from a source connected to the supply port opening 30 to each of the solenoid intake ports 64, 72. In the illustrated embodiment, the first service port 22 extends into the manifold 12 such that it is in fluid communication with the first solenoid flow port 62 and the first pressure sensor port 66. The second service port 24 extends into the manifold such that it is in fluid communication with the second solenoid flow port 70 and the second pressure sensor port 74. The exhaust port 26 extends into the manifold into fluid communication with the solenoid exhaust port 82. In the illustrated embodiment, the first 22 and second 24 service ports are generally perpendicular to the supply port 20 and the exhaust port 26; however, in another embodiment the ports may extend at various angles with respect to each other. In the illustrated embodiment, the manifold system includes three solenoids 13, 14 and 15, corresponding to the first service port 22, the second service port 24 and the exhaust port 26 respectively. In an alternative embodiment, wherein the manifold block includes a greater or lesser number of service ports, the number of solenoids may vary such that each service port is uniquely associated with a solenoid valve. In one embodiment, wherein the manifold block 12 does not include an exhaust port, the system 10 may include an equal number of solenoids and service ports.

In the illustrated embodiment, the circuit board 16 is a conventional printed circuit board or the like. The circuit board 16 is mounted to the manifold system 10, for instance, by attaching the circuit board 16 to the upper surfaces 110 of the solenoid brackets 108. As shown, the circuit board 16 includes an upper surface 111 and a lower surface 113 opposite the upper surface 111. In one embodiment, the circuit board 16 is positioned such that it is generally parallel to the upper surface 40 of the manifold 12. In particular, in the illustrated embodiment the upper 111 and lower surfaces 113 are oriented generally parallel to the upper surface 40 of the manifold 12. As shown, the circuit board 16 defines a plurality of mounting holes 112, and the solenoids 13, 14, 15 each include a plurality of pins 114 extending from the upper surfaces 110 of their respective solenoid brackets 108. The pins 114 extend into the holes 112 to attach the circuit board 16 to the solenoids 13, 14, 15. Alternatively, the circuit board 16 could be connected to one or more of the solenoids in a different manner, or the circuit board could be connected directly to the manifold 12. As shown, the circuit board 16 is sized to cover substantially all of the upper surface 40 of the manifold 12.

The circuit board 16 is electrically connected to each of the solenoids 13, 14, 15, and it communicates with a controller (not shown) capable of operating the solenoids to move between their first and second positions. The controller may be wired to the circuit board, or it may communicate wirelessly with the circuit board 16. In addition, the circuit board 16 may include a variety of other components for controlling or monitoring various functions of an air suspension system, such as a compressor motor, a pressurized tank, height sensors, angular position sensors, air filters, air shocks and GPS devices. In the illustrated embodiment, two pressure sensors 120, 122 are connected to the circuit board 16. The pressure sensors 120, 122 are capable of sensing the amount of pressure within a volume of air or fluid and outputting a signal indicative of the measured pressure. The pressure sensors 120, 122 may communicate with the controller such that the controller can be programmed to operate the solenoids 13, 14, 15 or another component as a function of the pressure sensed by the pressure sensors 120, 122. In one embodiment, the pressure sensors may be 26PC Series pressure sensors manufactured by Honeywell, Inc. As shown, the pressure sensors 120, 122 are mounted to the circuit board 16 such that the extend toward the manifold 12. A portion of the first pressure sensor 120 extends into the first pressure sensor port 66, and a portion of the second pressure sensor 122 extends into the second pressure sensor port 74. As a result of the fluid communication between the first service port 22 and the first pressure sensor port 66, the first pressure sensor 120 is capable of sensing a pressure level within the first service port 22. As a result of the fluid communication between the second service port 24 and the second pressure sensor port 74, the second pressure sensor 122 is capable of sensing a pressure level within the second service port 24. In one embodiment, the circuit board 16 additionally includes four upwardly extending connector pins 130 capable of connecting to a power supply, such as a wire harness. The connector pins 130 may also be capable of transferring information regarding the circuit board 16 when they are inserted into a plug (not shown) connected to a computer or other device, for instance, the connector pins 130 could enable the transfer of diagnostic information including information regarding the status of any components in communication with the circuit board 16.

Referring to FIG. 3, the cover 18 includes an upper surface 140, and a lower surface 142. The lower surface 142 defines an opening that is sized to enclose the solenoids 13, 14, 15, the circuit board 16 and any other components mounted to the upper surface 40 of the manifold 12. The cover 18 may be attached to the manifold by a plurality of fasteners 144 that extend through holes 146 in the manifold 12 and into the lower surface 142 of the cover 18. A gasket 148 may be positioned between the lower surface 142 of the cover 18 and the upper surface 40 of the manifold 12 to help form a sealed enclosure for the solenoids and the circuit board 16. In one embodiment, a tubular protrusion 150 extends from the upper surface 140 of the cover 18. The protrusion 150 aligns with the prongs 130 when the cover 18 is attached to the manifold 12 such that the prongs extend upwardly through the protrusion 150. In one embodiment, the upper surface 152 of the protrusion 150 may be sealed by a cover (not shown) when the diagnostic prongs 130 are not in use.

Figure 9:
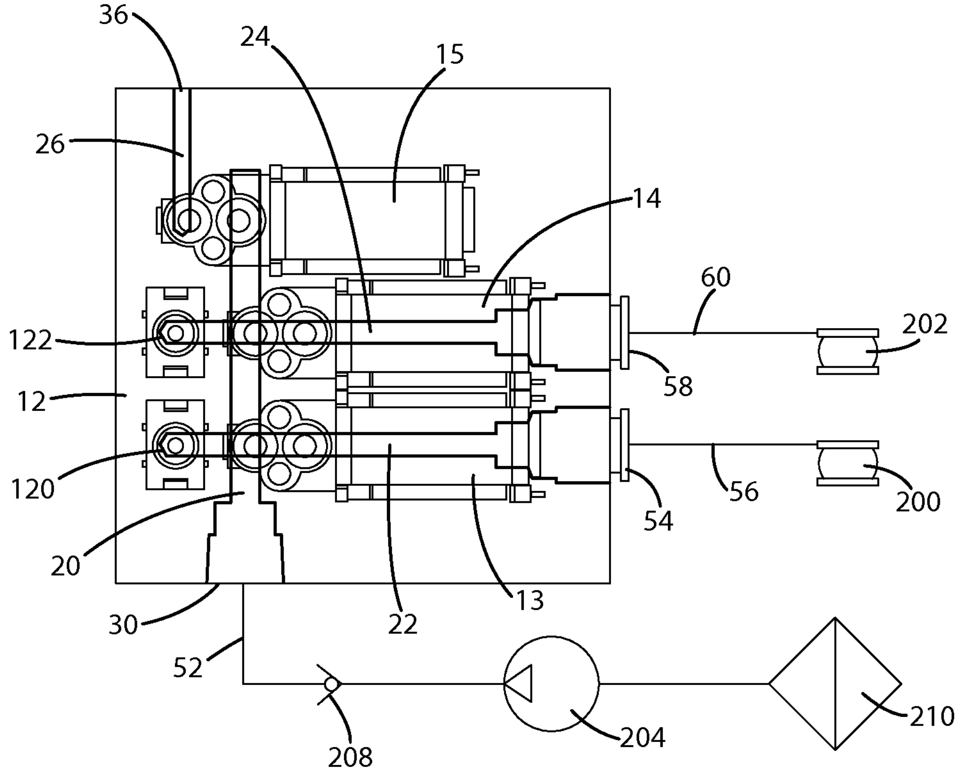
FIG. 9 is a schematic view of the manifold system connected to a compressor and an air spring.

FIG. 9 shows a schematic layout of one embodiment of the manifold system 10 connected to the components of an air suspension system, including a first air shock 200, a second air shock 202, and a compressor 204. The components may be connected via air hoses 52, 56 and 60. As shown, the compressor 204 is connected to the supply port 20, for instance, by connecting a quick connector (not shown) on the air hose 52 to the fitting at the opening 30 of the supply port 20. The compressor 204 can be operated, by activating the compressor motor, to force pressurized air or another fluid into the supply port 20. A check valve 208 may be positioned between the compressor 204 and the supply port 20, or at the outlet of the compressor 204, to prevent fluid from flowing back into the compressor 204 and to maintain pressure within the supply port 20. In addition, the compressor 204 may include a filter 210 for removing particulates from the fluid flowing through the compressor 204 and into the supply port 20. Each service port 22, 24 may be connected to a pneumatic device, such as the air springs 200, 202, such that the manifold system 10 can be controlled, as discussed below, to selectively force pressurized fluid into the air springs 200, 202 or to selectively exhaust fluid from the air springs 200, 202.

III. Operation

The manifold system 10 can be operated to monitor and control the flow of fluid from the compressor 204 to the air springs 200, 202, or to other components connected to the manifold. In one embodiment, the controller may be operable to activate the compressor motor 204 to turn on the compressor 204 and deliver pressurized fluid to the supply port 20. The first 13 and second 14 solenoids can be operated to selectively allow the pressurized fluid to flow through the first 22 and second 24 service ports, or to prevent fluid from flowing through the service ports 22 and 24. As a result of the supply port 20 being fluidly connected to both of the service ports 22, 24 via their respective solenoids 13, 14 and also connected to the exhaust port 26 via the third solenoid 15, controlling the air springs 200, 202 simply requires opening a desired solenoid 13, 14 with the third solenoid 15 closed to fill the desired air spring, or opening a desired solenoid 13, 14 with the third solenoid 15 also open to exhaust air from the desired air spring. More particularly, the first solenoid 13 can be moved between the first position, in which it prevents the pressurized fluid from flowing through the intake passage 90 and the solenoid output passage 92 of the first solenoid 13, and the second position, in which the plunger moves to allow the pressurized fluid to flow through the intake passage 90 and the outlet passage 92 and into the service port 22. The second solenoid 14 can be moved between the first position, in which it prevents the pressurized fluid from flowing through the intake passage 90 and output passage 92 of the second solenoid 14, and the second position, in which the plunger moves to allow the pressurized fluid to flow through the intake passage 90 and the outlet passage 92 and into the service port 24. The third solenoid 15 can be selectively operated to connect the supply port 20 to the exhaust port 26, enabling any passage connected to the supply port 20 to be exhausted. More particularly, the third solenoid 15 can be operated to move between the first position, in which pressurized fluid is prevented from flowing through the intake passage 90 and the outlet passage 92 of the third solenoid 15 to the to the exhaust port 26, and the second position, in which the fluid is allowed to flow through the intake passage 90 and the outlet passage 92 to the exhaust port 26.

A selected one, or more than one, air spring can therefore be filled by controlling the corresponding solenoid 13, 14 to move to the second position to fluidly connect the pressurized air from the compressor 204 to the corresponding air spring 200, 202 with the third solenoid 15 in the first position to prevent the air in the supply port 20 from flowing to the exhaust port 26. A different one of the air springs may be filled by controlling one of the solenoids 13, 14 to close by moving to the first position, and controlling the other of the solenoids 13, 14 to open by moving to the second position. In a similar manner, air may be removed from one or more of the air springs 200, 202 by controlling the solenoid 13, 14 corresponding to the desired air spring to move to the second, open position, and controlling the third solenoid 15 to move to the second, open position, thus fluidly connecting the desired one or more air springs to the exhaust port 26. The pressure sensors 120, 122, which are fluidly connected to the service ports 22, 24, are capable of outputting the pressure level within the output ports 22, 24. At any time, the connector pins 130 may be utilized by a user to determine the status of the system components.

Although the manifold system 10 is shown and described as having two output ports 22, 24, it should be noted that the manifold system 10 could be provided with any desired number of output ports to enable control of a desired number of air springs or other pneumatic devices. Each additional output can be formed by adding an additional port and an additional solenoid to the manifold system 10. The additional port would extend into fluid engagement with the supply port 20 and with the outlet passage of the additional solenoid. In this way, the additional service port could be selectively connected to the supply port 20 by opening and closing the additional solenoid, and could be connected to exhaust by opening the exhaust solenoid 15 and the additional solenoid.

IV. Second Embodiment

A second embodiment of the manifold system is shown in FIGS. 10-21 and generally designated 1010. Similar to the first described embodiment, the manifold system 1010 generally includes a manifold block 1012, a plurality of solenoids 1014 mounted on the manifold 1012, a circuit board 1016 mounted to the solenoids 1014 or the manifold 1012, and a cover 1018 enclosing the solenoids 1014. This embodiment varies from the first described embodiment in that this embodiment includes poppet valves instead of direct acting valves. The poppet valves include poppet assemblies 1020 that can be moved by the solenoids to open or close the service ports, exhaust port and the outlet ports. Poppet valves enable the manifold to control greater volumes of high pressure fluid with relatively low solenoid power.

Figure 10:
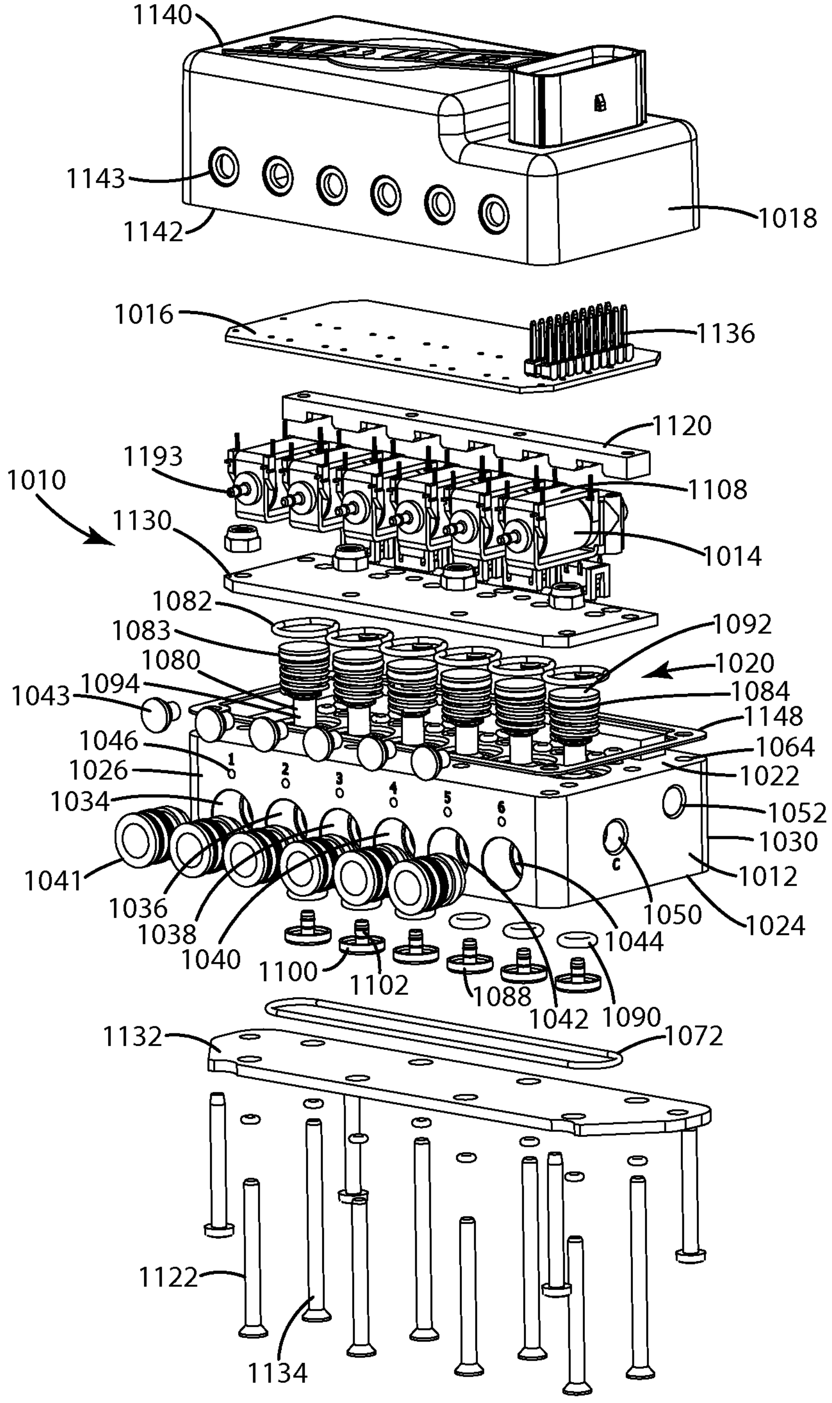
FIG. 10 is an exploded view of a manifold system according to a second embodiment of the present invention.
Figure 11:
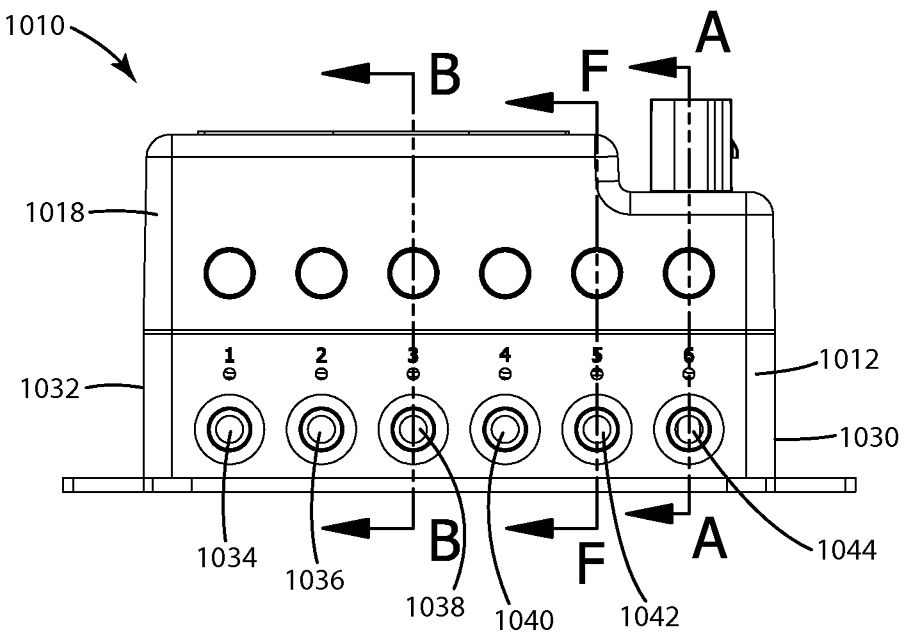
FIG. 11 is a front view of a manifold system according to the second embodiment.
Figure 15:
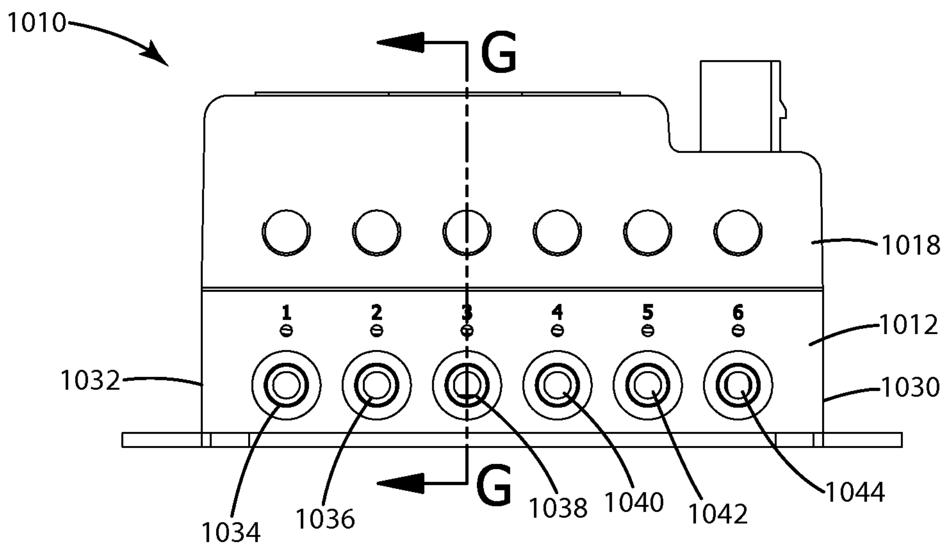
FIG. 15 is a front view of a manifold system according to the second embodiment.
Figure 17:
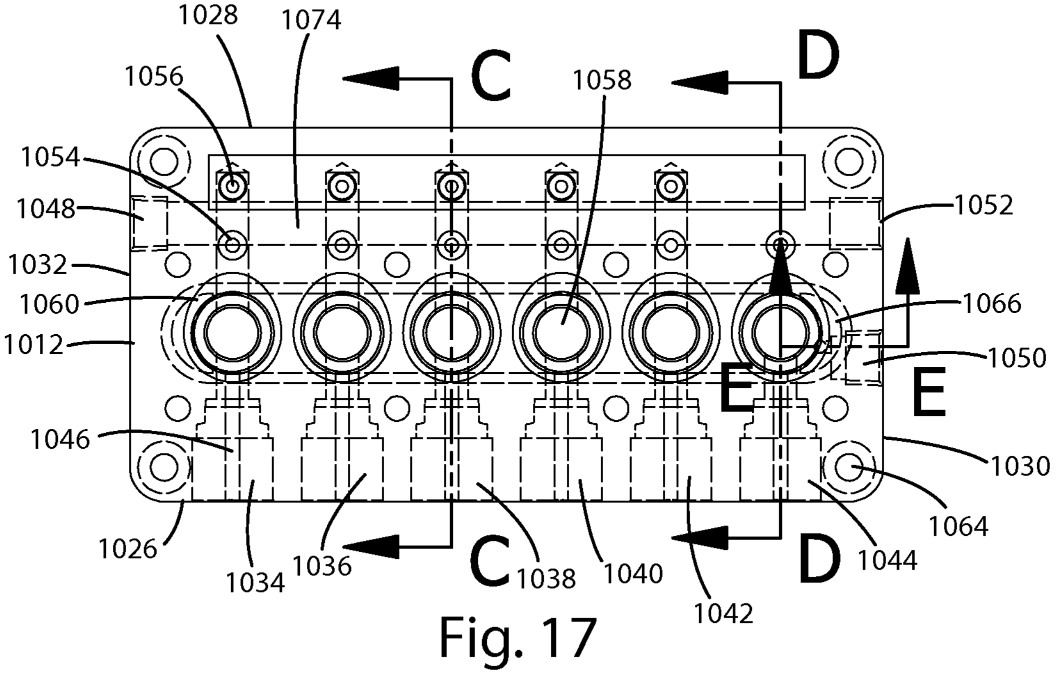
FIG. 17 is a top view of a manifold according to the second embodiment.

The manifold block 1012 generally includes an upper surface 1022, a lower surface 1024, a front surface 1026, a rear surface 1028, a right side surface 1030 and a left side surface 1032. Referring now to FIGS. 10 and 17, in the illustrated embodiment, the front surface 1026 defines twelve port openings, including four service ports 1034, 1036, 1038 and 1040, a tank port 1042 and an exhaust port 1044 arranged generally in a line extending across the front surface 1026 from the left side 1032 to the right side 1030. Six solenoid exhaust vents 1046, which are generally smaller than the service ports, are positioned in a line extending across the front surface 1026 generally parallel to the service ports, and are spaced apart such that one solenoid exhaust vent 1046 is positioned directly above each of the service ports 1034, 1036, 1038 and 1040, the tank port 1042 and the exhaust port 1044. As shown in FIGS. 10, 11 and 15, the corresponding pairs of solenoid exhaust ports 1036, service ports 1034, 1036, 1038 and 1040, tank port 1042 and exhaust port 1044 may be designated by position indicators 1 through 6 on the front surface 1026 of the manifold 1012. In the illustrated embodiment, each of the service ports, tank port 1042 and exhaust port 1044 may include a fitting 1041 for easy connection and removal of an air hose.

The left side surface 1032 defines a first solenoid galley opening 1048, and the right side surface 1030 defines a second solenoid galley opening 1052 opposite the first solenoid galley opening 1048, and a compressor port 1050.

The upper surface 1022 of the manifold block 1012 defines a plurality of solenoid intake ports 1054, a plurality of pressure sensor ports 1056 and a plurality of poppet receptacles 1058. In the illustrated embodiment, six poppet receptacles 1058 are defined in the upper surface 1022, and are spaced apart along the upper surface such that one poppet receptacle 1058 is generally aligned with one of each of the service ports 1034, 1036, 1038 and 1040, the tank port 1042 and the exhaust port 1044. As shown, the six solenoid intake ports 1054 are arranged in a line extending generally parallel to the poppet receptacles 1058, with one solenoid intake port 1054 being uniquely associated with each of the poppet receptacles 1058. The five pressure sensor ports 1056 are arranged in a line extending generally parallel to the poppet receptacles 1058 and the solenoid intake ports 1054, with one pressure sensor port 1056 being aligned with and uniquely associated with each of the service ports 1034, 1036, 1038 and 1040 and one pressure sensor port being aligned with and uniquely associated with the tank port 1042. In the illustrated embodiment, the poppet receptacles 1058 include a first, generally egg-shaped portion 1060 extending into the upper surface 1022 a first distance and a second, generally circular portion 1062 extending from the bottom of the egg-shaped portion 1060 into the manifold a second distance that, in one embodiment, is greater than the first distance. The egg-shaped portion 1060 may have a width in at least one direction that is wider than the diameter of the circular portion 1062. As discussed below, the portion of greater width enables the egg-shaped portion 1060 to function as a solenoid flow port for the solenoid 1014 associated with that particular poppet receptacle 1058, wherein air flowing through the solenoid 1014 from the solenoid intake port 1054 flows into the egg-shaped portion 1060 and into contact with the poppet assembly 1020. In addition, the manifold 1012 includes a plurality of fastener holes 1064 extending into the upper surface 1022 and completely through the manifold 1012.

Figure 18:
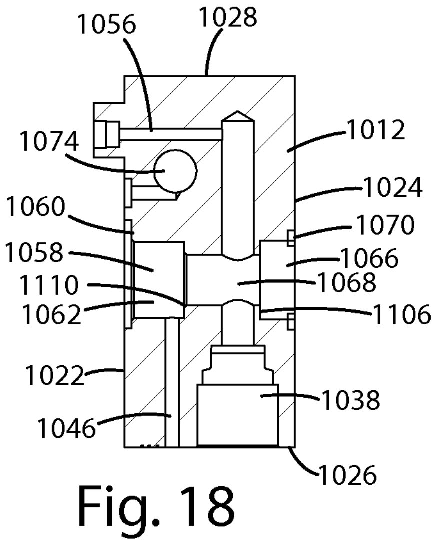
FIG. 18 is a cross sectional view taken along line C-C in FIG. 17.
Figure 19:
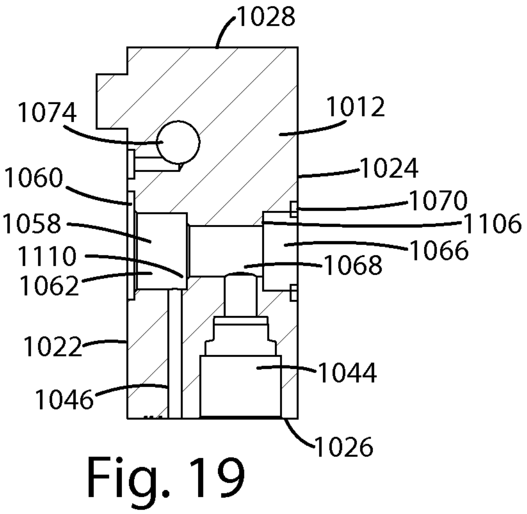
FIG. 19 is a cross sectional view taken along line D-D in FIG. 17.
Figure 20:
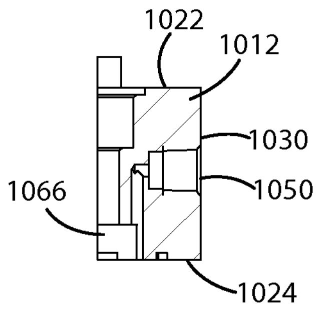
FIG. 20 is a cross sectional view taken along line E-E in FIG. 17.
Figure 21:
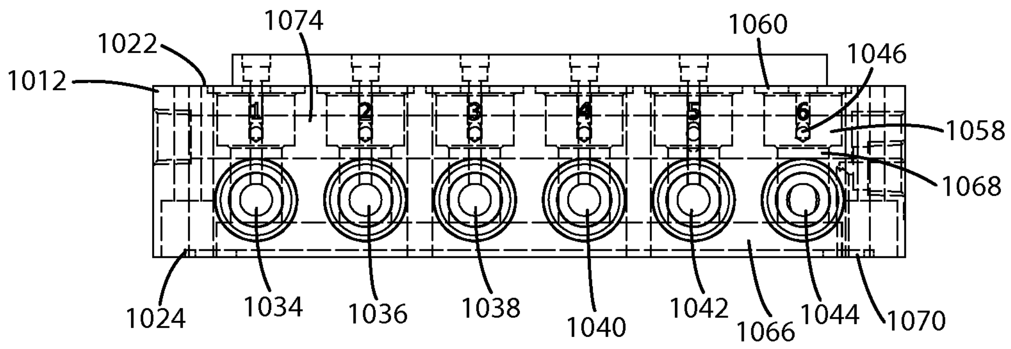
FIG. 21 is a front view of a manifold according to the second embodiment.

Referring to FIGS. 17-21, the lower surface 1024 defines a high flow galley 1066. The high flow galley 1066 extends across substantially the entire length of the manifold from the left side surface 1028 to the right side surface 1026. The high flow galley 1066 is aligned opposite the line of poppet receptacles 1058, such that it extends underneath each of the poppet receptacles 1058. As shown in FIG. 21, the high flow galley 1066 extends into the lower surface 1024 a first distance. A plurality of lower poppet receptacle portions 1068 extend into the manifold 1012 from the high flow galley 1066 a second distance. As shown in FIGS. 18-19, each of the lower poppet receptacles 1068 is aligned with one of the poppet receptacles 1058, and each lower poppet receptacle 1068 extends through the manifold into communication with the corresponding aligned poppet receptacle 1058. In one embodiment, a sealing ring recess 1070 extends into the lower surface 1024 of the manifold 1012 around the perimeter of the high flow galley 1066 for positioning a sealing ring 1072 in the sealing ring recess 1070 to seal the high flow galley 1066.

Figure 12:
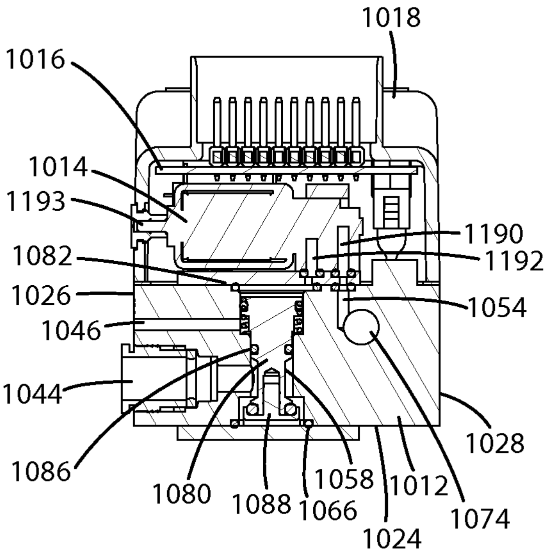
FIG. 12 is a cross sectional view taken along line A-A in FIG. 11.
Figure 13:
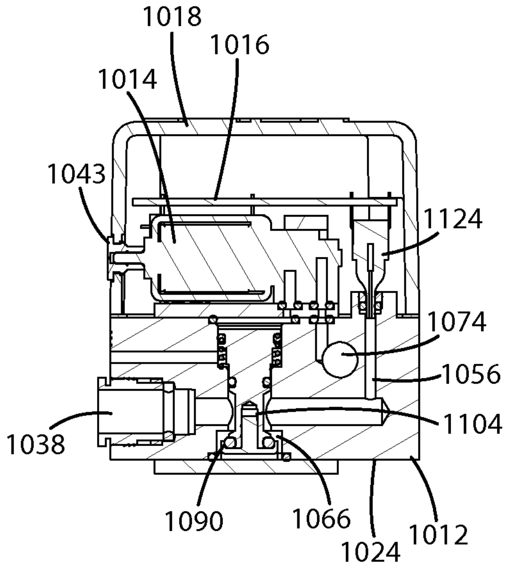
FIG. 13 is a cross sectional view taken along line B-B in FIG. 11
Figure 14:
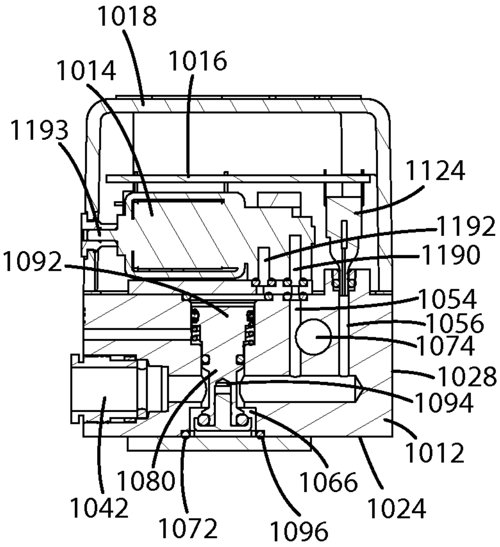
FIG. 14 is a cross sectional view taken along line F-F in FIG. 11.

As shown in FIGS. 17-19, a solenoid galley 1074 extends through the manifold 1012 from the first solenoid galley 1048 opening to the second solenoid galley opening 1052. Although the illustrated embodiment shows the solenoid galley 1074 extending completely through the manifold 1012, in another embodiment, the solenoid galley 1074 may extend only a portion of the way through the manifold 1012, such that it includes only one of the openings 1048, 1052. Although not shown, the openings 1048, 1052 may be plugged to prevent air flow from exiting the solenoid galley 1074 during operation of the manifold system 1020. Similar to the supply port 20 of the first embodiment, the solenoid galley 1074 extends through the manifold 1012 to such an extent that it is in fluid communication with each of the solenoid intake ports 1054 to enable air flowing through the solenoid galley 1074 to flow into each of the solenoid intake ports 1054. As shown in FIG. 12 and FIG. 19, the exhaust port 1044 extends into the front surface 1026 into fluid communication with the corresponding poppet receptacle 1058. As shown in FIGS. 13 and 18, the service ports 1034, 1036, 1038 and 1040 extend into the front surface 1026 into fluid communication with the corresponding poppet receptacles 1058 and into fluid communication with the corresponding pressure sensor ports 1056. As shown in FIG. 14, the tank port 1042 extends into the front surface 1026 into fluid communication with the corresponding poppet receptacle 1058, the corresponding solenoid intake port 1054 and the corresponding pressure sensor port 1056. The solenoid intake port 1054 that is aligned with the tank port 1042 thus includes a first portion that extends from the upper surface 1022 to the solenoid galley and a second portion that extends beyond the solenoid galley 1074 to the tank port 1042. The solenoid exhaust vents 1046 each extend into the front surface 1026 into fluid communication with the circular portion 1062 of the corresponding poppet receptacle 1058. Referring now to FIGS. 10, 17 and 20, the compressor port 1050 extends into the right side surface 1030 and turns approximately 90 degrees to extend into fluid communication with the high flow galley 1066.

Each poppet receptacle 1058 receives a poppet assembly 1020, which generally includes a poppet 1080, an upper sealing ring 1082, a poppet head sealing ring 1083, a poppet spring 1084, a central sealing ring 1086, a poppet retainer 1088, and a retainer sealing ring 1090. The upper sealing ring 1082 fits into the egg-shaped portion 1060 of the poppet receptacle 1058. The poppet 1080 extends into the poppet receptacle 1058, including a poppet head 1092 extending through the circular portion 1062 of the poppet receptacle 1058, a poppet neck 1094 extending from the poppet head 1092 that is narrower than the poppet head 1092, and a poppet plate 1096 extending radially outwardly from the neck 1094 and spaced from the poppet head 1092. The poppet neck 1094 extends through the corresponding lower poppet receptacle 1068 and the poppet plate 1096 extends beyond the lower poppet receptacle 1068 into the high flow galley 1066. The poppet head 1092 receives the poppet head sealing ring 1083, which seals between the poppet head 1092 and the circular portion 1062 of the receptacle 1058. The poppet neck 1094 receives the central sealing ring 1086, which seals between the poppet neck 1094 and the corresponding lower poppet receptacle 1068. The poppet retainer 1088 includes a base 1100 and a prong 1102 extending from the base 1100. A lower end 1104 of the poppet 1080 defines a hole that receives the prong 1102. The poppet plate 1096 and the base 1100 of the poppet retainer 1088 combine to sandwich the retainer sealing ring 1090. The poppet spring 1084 extends around the poppet head 1092 and engages the lower edge 1110 (See FIG. 19) of the circular portion 1062 of the poppet receptacle 1058.

Figure 16:
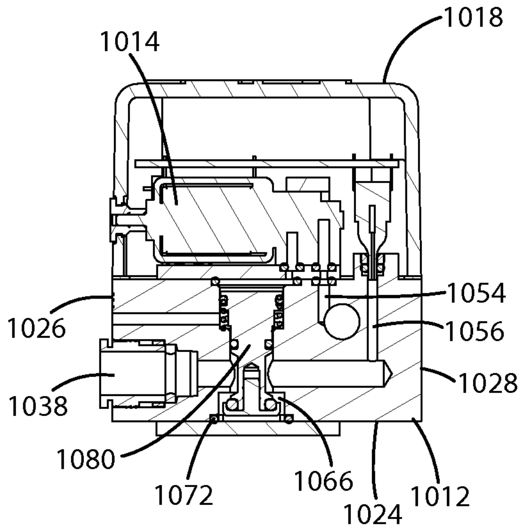
FIG. 16 is a cross sectional view taken along line G-G in FIG. 15.

As shown in FIGS. 13 and 16, the poppet 1080 can be moved within the poppet receptacle 1058 between an open position (FIG. 13) in which the poppet 1080 is lowered within the receptacle 1058 to separate the retainer sealing ring 1090 from the upper wall 1110 of the high flow galley 1066 and a closed position (shown in FIG. 16) in which the poppet 1080 is raised to engage the retainer sealing ring 1090 with the upper wall 1106 of the high flow galley 1066. When the poppet 1080 is in the open position, air is capable of flowing from the high flow galley 1066 past the retainer sealing ring 1090 and into the corresponding service port 1034, 1036, 1038 or 1040, tank port 1042 or exhaust port 1044.

In the second embodiment, an upper plate 1130 and lower plate 1132 are positioned on opposing sides of the manifold 1012 to seal the poppet receptacles 1058 and the high flow galley 1066. As shown in FIG. 10, the upper plate 1130 is positioned over the upper surface 1022 of the manifold 1012 to retain the upper sealing rings 1082 in the poppet receptacles 1058 and to prevent air flow from the popper receptacles 1058. The lower plate is positioned over the lower surface 1024 of the manifold 1012 to retain the sealing ring 1072 in the sealing ring recess 1070 and to prevent air flow from the high flow galley 1066. The upper 1130 and lower 1132 plates may be held together on opposite sides of the manifold 1012 by fasteners 1122 extending through the plates 1130, 1132 and some of the fastener holes 1064 in the manifold 1012.

The solenoids 1014 are substantially the same as the solenoids 13, 14, 15 described in connection with the first embodiment. In one embodiment, each solenoid 1014 includes an intake passage 1190, an outlet passage 1192 and an exhaust passage 1193. When the plunger is in the first or "closed" position, the portion of the plunger extending into the valve body seals off fluid flow through the valve body to prevent fluid flow through the outlet passage 1192. The outlet passage 1192 is in fluid communication with the exhaust passage 1193 to enable any air within the corresponding poppet receptacle 1058 to vent to atmosphere. When the plunger is in the second or "open" position, the solenoid allows fluid to flow into the intake passage 1190 and through the outlet passage 1192.

In the second embodiment, the solenoids 1014 are mounted to the upper surface 1022 of the manifold 1012 to control fluid flow through the various ports in the manifold 1012. As in the first embodiment, the solenoids 1014 are mounted with their longitudinal lengths oriented generally parallel to the upper surface 1022 of the manifold 1012 and to the longitudinal length of the service ports 1034, 1036, 1038 and 1040, such that the solenoid plungers (not shown) are movable in a direction generally parallel to the upper surface 1022 of the manifold 1012. The solenoids 1014 are positioned on the upper surface 1022 with the inlet passage 1190 of each solenoid 1014 aligned with one of the solenoid intake ports 1054 and the outlet passage 1192 aligned within the egg-shaped portion of one of the poppet receptacles 1058. Each solenoid 1014 is uniquely associated and aligned with one of the poppet assemblies 1020. In one embodiment, a clamp bar 1120 is positioned over the solenoids 1014 such that fasteners 1134 can extend through the manifold 1012 and the clamp bar 1120 to mount the solenoids 1014 to the manifold 1012. Of course, the mounting arrangements may vary from application to application.

The circuit board 1016 of the second embodiment is substantially the same as the circuit board of the first embodiment. The circuit board 1016 is mounted to the manifold system 1010, for instance, by attaching the circuit board 1016 to the upper surfaces 1112 of the solenoid brackets 1108. The circuit board 1016 is electrically connected to each of the solenoids 1014, and it communicates with a controller (not shown) capable of operating the solenoids to move between their first and second positions. As in the first embodiment, the circuit board 1016 additionally includes upwardly extending connector pins 1136 capable of connecting to a power supply, such as a wire harness.

Pressure sensors 1124 are connected to the circuit board 1016. The pressure sensors 1124 are the same as the pressure sensors 120, 122 of the first embodiment. A portion of the each pressure sensor 1124 extends into one of the pressure sensor ports 1056 such that the pressure sensors are capable of sensing a pressure level within the corresponding service port or tank port.

The cover 1118 is substantially the same as the cover 18 of the first embodiment. The cover 1118 includes an upper surface 1140, and a lower surface 1142. The lower surface 1142 defines an opening that is sized to enclose the solenoids 1014, the circuit board 1016 and any other components mounted to the upper surface 1022 of the manifold 1012. A gasket 1148 may be positioned between the lower surface 1142 of the cover 1018 and the upper surface 1022 of the manifold 1012 to help form a sealed enclosure for the solenoids 1014 and the circuit board 1016. The cover may additionally include a series of ports 1143 that are spaced apart and generally aligned with the solenoids 1014. The ports 1143 may each receive a grommet 1043, such as a rubber grommet, which engages the solenoid 1014 and the port 1143 to provide a seal for the solenoids 1014 within the enclosure.

Operation of the second embodiment is similar to the operation of the first embodiment described above, except that the movement of the solenoid plungers between the first position and the second position causes movement of the poppets 1080 between the open position and the closed position. Similar to the first embodiment, the manifold system 1010 can be operated to monitor and control the flow of fluid from a compressor or a compressed air tank to one or more air springs, or to other components connected to the manifold. In one embodiment, both the compressor port 1050 and the tank port 1042 are capable of functioning as supply ports for supplying pressurized fluid to the manifold block 1012. The controller may be operable to activate the compressor motor to turn on the compressor and deliver pressurized fluid from the compressor to the compressor port 1050. The controller may otherwise be operable to activate the compressed air tank to open the tank and deliver high pressure compressed air from the tank into the tank port 1042.

The solenoids 1014 can be operated to selectively move one or more desired poppets 1080 into the open position. In particular, the solenoids 1014 are all in fluid communication with the solenoid galley 1074 via the solenoid intake ports 1054. Pressurized fluid from a tank can flow to the solenoid galley 1074 by flowing directly through the tank port 1042 and into the solenoid intake port 1054 corresponding to the tank port 1042 (see FIG. 14). Alternatively, pressurized air from a compressor attached to the compressor port 1050 may flow to the solenoid galley 1074 when the poppet corresponding to the tank port 1042 is opened, by flowing through the compressor port 1050, into the high flow galley 1066, then into the tank port 1042 and into the solenoid intake port 1054 corresponding to the tank port 1042. Because the solenoids 1014 are all in fluid communication with the solenoid galley 1074, movement of any of the solenoid plungers from the first position to the second position will cause pressurized air to flow from the solenoid galley 1074 into the solenoid intake port 1054 of that solenoid 1014, into the solenoid's inlet passage 1190, and then out of the solenoid's flow passage 1192 and into the egg-shaped portion 1060 of the corresponding poppet receptacle 1058. The pressurized air in the egg-shaped portion 1060 will force the poppet 1080 to move downwardly, against the force of the spring 1084, into the open position. Movement of that solenoid plunger back to the first position will cease the pressure on the poppet 1080 and the pressurized air above the poppet 1080 will exit the manifold through the rear of the solenoid and allow the spring 1084 to raise the poppet 1080 back to the closed position.

As a result of the high flow galley 1066 being fluidly connected to all of the service ports 1034, 1036, 1038 and 1040, the tank port 1042 and the exhaust port 1044 when their respective poppets 1080 are opened, filling one or more of the air springs simply requires: (1) moving the desired solenoid 1014 to open the poppet 1080 corresponding the tank port 1042 to open flow from the tank port to the high flow galley 1066; (2) moving the desired one or more solenoids 1014 to open the poppet(s) 1080 corresponding to the desired one or more service ports 1034, 1036, 1038 or 1040 to allow air to flow from the high flow galley 1066 into the desired one or more service ports; and (3) maintaining the solenoid 1014 and poppet 1080 corresponding to the exhaust port 1044 in the closed position to prevent air from exhausting from the high flow galley 1066. High pressure tank air can be used to fill air springs (if the tank is opened) by connecting the tank to the tank port 1042 and opening the tank port's poppet 1080 to allow the tank air to flow into the high flow galley 1066, and then out of the high flow galley 1066 into the desired one of the service ports to fill the desired air spring. Alternatively, lower pressure air from a compressor can be used to fill an air spring by connecting a compressor to the compressor port 1050 allowing air to flow from the compressor into the high flow galley 1066, and then opening the poppet 1080 corresponding to the desired service port to allow the compressor air to flow from the high flow galley 1066 into the desired service port. Air can be exhausted from any of the air springs by: (1) closing the solenoid 1014 corresponding to the tank port 1042 (or turning off the compressor), cutting off the pressurized air supply to the high flow galley 1066, and (2) opening the solenoid 1014 and poppet 1080 corresponding to the exhaust port 1044, allowing the pressurized air from the air spring to exhaust form the manifold by flowing through the service port, then the high flow galley 1066 and then through the exhaust port 1044.

Put in broader terms, pressurized air is supplied to the manifold block 1012 through one of two supply ports: the tank port 1042 and the compressor port 1050. The air flowing into the solenoid galley 1074 is used—upon activation of the solenoids—to control the movement of the poppets 1080, and the movement of the poppets 1080 controls the flow of air through the high flow galley 1066, the service ports 1034, 1036, 1038 and 1040, the tank port 1042 and the exhaust port 1044. Filling a desired air spring connected to one of the service ports requires opening the poppet corresponding to that service port and opening either the tank port poppet (if filling with tank air) or turning on the compressor (if filling with compressor air). Exhausting any one of the air springs requires opening the poppet corresponding to that service port and opening the poppet corresponding to the exhaust port.

The inclusion of both a compressor port 1050 and a tank port 1042 enables the manifold system 1010 to fill an air spring at a "fast" rate, using high pressure air from the tank, or at a "slow" rate (i.e., slower than the tank) using lower pressure air from the compressor. In one embodiment, the controller can be controlled to alternate between tank and compressor air in the high flow galley 1066 as desired, such that at any given time, the air springs can be filled at a fast rate or the slower rate. For example, when operating to raise an air spring connected to one of the output ports to a target height, the controller may initially use tank air to fill the air spring at a fast rate, and may then close the tank poppet and energize the compressor to more solely move the air spring up to the target height. The combination of fast and slow operation of the system 1010 may increase accuracy in raising an air spring to a desired height.

Although the manifold system 1010 is shown and described as having four output ports 1034, 1036, 1038, 1040, it should be noted that the manifold system 1010 could be provided with any desired number of output ports to enable control of a desired number of air springs or other pneumatic devices. Each additional output can be formed by adding an additional port and an additional solenoid to the manifold system 1010. The additional port would extend into fluid engagement with the supply port 20 and with the outlet passage of the additional solenoid. Although the tank port 1042 is described herein as a “supply port,” in one embodiment the tank port 1042 could also be used as an exhaust port, for instance, in a situation where the tank has an exhaust feature, the air from the high flow galley 1066 could be exhausted by opening the tank port 1042 and allowing the air to exhaust via the tank.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles “a,” “an,” “the” or “said,” is not to be construed as limiting the element to the singular.

The embodiments of the invention in which an exclusive property of privilege is claimed are defined as follows:

1. A manifold system comprising:

a manifold block defining a service port extending in a first direction through said manifold block, and a supply port extending in a second direction through said manifold block, said manifold block having a front surface, an upper exterior surface and a lower exterior surface opposite said upper exterior surface, wherein said manifold block includes a solenoid port and a pressure sensor port extending into said upper surface, and wherein said service port extends into said front surface, said solenoid port and said pressure sensor port aligned above said service port and in fluid communication with said service port;

a solenoid valve mounted on said upper exterior surface of said manifold block, said solenoid valve having an inlet passage aligned with said solenoid port, said solenoid valve capable of being actuated to place said supply port in fluid communication with said service port, said solenoid valve having a longitudinal length extending in a direction in which said solenoid valve is movable between a first position and a second position, said longitudinal length extending generally parallel to and aligned above said service port;

a circuit board mounted adjacent said solenoid valve, said circuit board positioned generally parallel to said longitudinal length of said solenoid, wherein said solenoid is positioned between said circuit board and said upper exterior surface of said manifold block;

a pressure sensor attached to said circuit board and extending into said pressure sensor port, wherein said pressure sensor is positioned above said service port in alignment with said longitudinal length of said solenoid valve; and a cover enclosing said solenoid valve, said circuit board and said pressure sensor between said cover and said manifold block, said cover having a lower surface abutting said upper surface of said manifold block to form a sealed enclosure for said solenoid valve and said circuit board while leaving said service port on said front surface uncovered and accessible.

2. The manifold system of claim 1 wherein said solenoid valve is in fluid communication with said supply port.

3. The manifold system of claim 2 including a plurality of said solenoid valves, a plurality of said service ports, and an exhaust port wherein said plurality of solenoid valves includes a plurality of service solenoid valves and an exhaust solenoid valve, each said service port uniquely associated with one of said service solenoid valves, said exhaust port uniquely associated with said exhaust solenoid valve, each of said service solenoid valves being movable between a closed position preventing fluid flow from said supply port to said associated service port and an open position allowing fluid flow from said supply port to said associated service port, said exhaust solenoid valve being movable between a closed position preventing fluid flow from said supply port to said exhaust port and an open position allowing fluid flow from said supply port to said exhaust port.

4. The manifold system of claim 3 wherein said plurality of service ports are generally parallel to each other.

5. The manifold system of claim 4 wherein said supply port is generally perpendicular to said plurality of service ports.

6. The manifold system of claim 5 wherein said manifold block defines a plurality of said solenoid ports in said upper exterior surface, said solenoid ports extending in a direction perpendicular to said service ports.

7. The manifold system of claim 6 wherein said plurality of solenoid ports includes a plurality of solenoid flow ports and a plurality of solenoid supply ports, each said solenoid flow port in fluid communication with one of said service ports when said associated service solenoid is in said open position, each said solenoid supply port in fluid communication with said supply port.

8. The manifold system of claim 1 wherein said manifold block defines a poppet receptacle, wherein a poppet is located within said poppet receptacle, said poppet being movable within said receptacle between an closed position preventing fluid flow between said supply port and said service port and an open position allowing fluid flow between said supply port and said service port, wherein movement of said solenoid valve between said first position and said second position moves said poppet between said open position and said closed position.

9. A manifold system comprising:

a manifold block having a front surface, a rear surface opposite said front surface, an upper surface and a lower surface opposite said upper surface, said manifold block defining a plurality of service ports, a plurality of solenoid intake ports and a plurality of pressure sensor ports in said upper surface, and a solenoid galley, said solenoid galley extending through said manifold block such that it is in fluid communication with each of said solenoid intake ports, said solenoid galley in fluid communication with a pressurized fluid source, at least one of said service ports connected to a pneumatic device, each of said solenoid intake ports aligned above an associated one of said service ports, each of said pressure sensor ports aligned above and in fluid communication with an associated one of said service ports;

a plurality of solenoids mounted to said manifold block, each said solenoid uniquely associated with and aligned above one of said solenoid intake ports and one of said service ports, each said solenoid being selectively movable between a first position preventing fluid flow into said associated service port and a second position allowing fluid to flow into said associated service port;

a circuit board mounted to at least one of said solenoids opposite said manifold block, with said at least one of said solenoids sandwiched between said circuit board and said manifold block, said circuit board electrically connected to said plurality of solenoids for controlling said movement of said solenoids;

a plurality of pressure sensors attached to said circuit board, each said pressure sensor extending into an associated one of said pressure sensor ports, wherein each said pressure sensor is positioned above an associated one of said service ports in alignment with an associated one of said solenoid valves; and a cover attached to said upper surface of said manifold block and forming a sealed enclosure for said circuit board and said solenoids between said cover and said upper surface of said manifold block with said front surface of said manifold block including said service ports remaining exposed.

10. The manifold system of claim 9 wherein said manifold block defines an exhaust port, one of said solenoids being uniquely associated with said exhaust port, said one of said solenoids being movable between a first position preventing fluid flow into said exhaust port and a second position allowing fluid flow into said exhaust port.

11. The manifold system of claim 10 wherein said solenoid galley extends in a direction perpendicular to said plurality of service ports.

12. The manifold system of claim 10 wherein said manifold block includes an upper surface, and wherein said circuit board extends over substantially all of said upper surface of said manifold block.

13. The manifold system of claim 10 wherein said manifold block includes an upper surface, and wherein said plurality of solenoid intake ports are defined in said upper surface of said manifold block.

14. The manifold system of claim 13 including a plurality of connector pins extending from said circuit board, said connector pins capable of connecting to at least one of a power supply and a receptacle for transferring information indicative of the status of said solenoids, said fluid pressure levels, said pressurized air source and said pneumatic devices.

15. The manifold system of claim 14 wherein said cover defines an opening, said opening receiving said connector pins.

16. The manifold system of claim 10 wherein said manifold block defines a high flow galley and a plurality of poppet receptacles in fluid communication with said high flow galley, said high flow galley capable of connecting to the pressurized fluid source, each said poppet receptacle including a poppet seated within said poppet receptacle, at least one of said poppet receptacles being uniquely associated with one of said solenoids and one of said service ports, wherein said movement of said one of said solenoids between said first and second positions causes movement of said poppet within said associated poppet receptacle between an open position and a closed position, wherein said poppet prevents fluid flow from said high flow galley into said associated service port when in said closed position and wherein said poppet allows fluid flow from said high flow galley to said associated service port when in said open position.

17. The manifold system of claim 16 wherein said exhaust port is in fluid communication with said high flow galley, said exhaust port being uniquely associated with one of said solenoids and one of said poppet receptacles, wherein movement of said associated solenoid between said first and second positions moves said poppet within said associated poppet receptacle between said open and closed positions, wherein said poppet allows fluid flow from said high flow galley to said exhaust port when said poppet is in said open position.

18. A method of manufacturing a manifold system, comprising:

providing a manifold block having an upper exterior surface, a supply port, a plurality of service ports, a plurality of pressure sensor ports, and an exhaust port, each of the service ports capable of being connected to an air spring, each of the pressure sensor ports aligned above an associated one of the service ports and in fluid communication with the one of the service ports;

mounting a plurality of output solenoids to the upper surface of the manifold block with the longitudinal length of each output solenoid generally parallel to the upper surface, each of the output solenoids being uniquely associated with one of the service ports, each of the output solenoids positioned with the longitudinal length aligned above the one of the service ports;

mounting an exhaust solenoid to the upper exterior surface of the manifold block with the longitudinal length of the exhaust solenoid being generally parallel to the upper surface of the manifold block, the exhaust solenoid being uniquely associated with the exhaust port, the exhaust solenoid positioned with the longitudinal length aligned above the exhaust port;

mounting a plurality of pressure sensors to said circuit board, each of said pressure sensors extending into one of said pressure sensor ports, each of said pressure sensor sensors in alignment with said longitudinal length of one of said plurality of output solenoids;

attaching a circuit board over at least a portion of said plurality of output solenoids and said exhaust solenoid; and attaching a cover to said upper surface of said manifold block to form a sealed enclosure for said output solenoids and said circuit board between said cover and said upper surface of said manifold block while leaving said supply port, said plurality of service ports and said exhaust port exposed and not covered by said cover to provide access to said supply port, said service ports and said exhaust port when said cover is attached.

* * * * *